(12) United States Patent
Stark

(10) Patent No.: US 8,585,031 B2
(45) Date of Patent: Nov. 19, 2013

(54) QUICK ACTION CLAMPING CYLINDER WITH A SIMPLIFIED STRUCTURE

(75) Inventor: Emil Stark, Goetzis (AT)

(73) Assignee: Andreas Maier GmbH & Co. KG, Fellbach (DE)

( * ) Notice: Subject to any disclaimer, the term of this patent is extended or adjusted under 35 U.S.C. 154(b) by 889 days.

(21) Appl. No.: 12/713,878

(22) Filed: Feb. 26, 2010

(65) Prior Publication Data

US 2010/0219574 A1   Sep. 2, 2010

Related U.S. Application Data

(63) Continuation of application No. 10/553,712, filed as application No. PCT/EP2004/003946 on Apr. 15, 2004, now abandoned.

(30) Foreign Application Priority Data

Apr. 15, 2003   (DE) .................................. 103 17 350

(51) Int. Cl.
    *B23Q 3/00*   (2006.01)
(52) U.S. Cl.
    USPC .......................................... 269/309; 269/310
(58) Field of Classification Search
    USPC ............... 269/309–310, 32, 24, 20; 279/2.06; 92/86
    See application file for complete search history.

(56) References Cited

U.S. PATENT DOCUMENTS

| 4,026,843 A * | 5/1977 | Kittle ............................... 521/86 |
| 4,906,123 A | 3/1990 | Weskamp et al. |
| 5,918,870 A | 7/1999 | Stark |
| 6,604,738 B2 * | 8/2003 | Haruna ......................... 269/309 |
| 6,997,448 B2 * | 2/2006 | Roth et al. ..................... 269/309 |
| 7,425,000 B2 * | 9/2008 | Stark ............................. 269/309 |
| 7,520,495 B2 * | 4/2009 | Stark ............................. 269/309 |
| 7,654,285 B2 * | 2/2010 | Stark ....................... 137/614.03 |
| 7,748,690 B2 * | 7/2010 | Stark ............................. 269/309 |

(Continued)

FOREIGN PATENT DOCUMENTS

| DE | 10118808 | 2/2003 |
| EP | 0827805 | 3/1998 |
| WO | 02078898 | 10/2002 |

OTHER PUBLICATIONS

International Searching Authority, International Search Report for PCT/EP2004/003946, mailed Sep. 1, 2004, 4 pages.

(Continued)

*Primary Examiner* — Lee D Wilson
(74) *Attorney, Agent, or Firm* — Hanley, Flight and Zimmerman, LLC

(57) ABSTRACT

A quick-action clamping cylinder is described which has a housing and a cover which covers the housing and has a center opening for receiving a retractable nipple that is arranged on the lower side of a workpiece pallet. The retractable nipple is locked in a spring-loaded manner in the housing by way of a plurality of locking balls that are spring-loaded in the locked position on the outer periphery of the retractable nipple. The locking balls are disengaged from the retractable nipple in the unlocked position by displacing a piston actuated by a pressurized medium. The disclosed examples provide a simple, small clamping system. To this end, the locking balls convert the spring force exerted by the springs into a multiple of the retraction force acting on the retractable nipple, by way of a lever arm transmission.

27 Claims, 14 Drawing Sheets

(56) References Cited

U.S. PATENT DOCUMENTS

Figure 1:
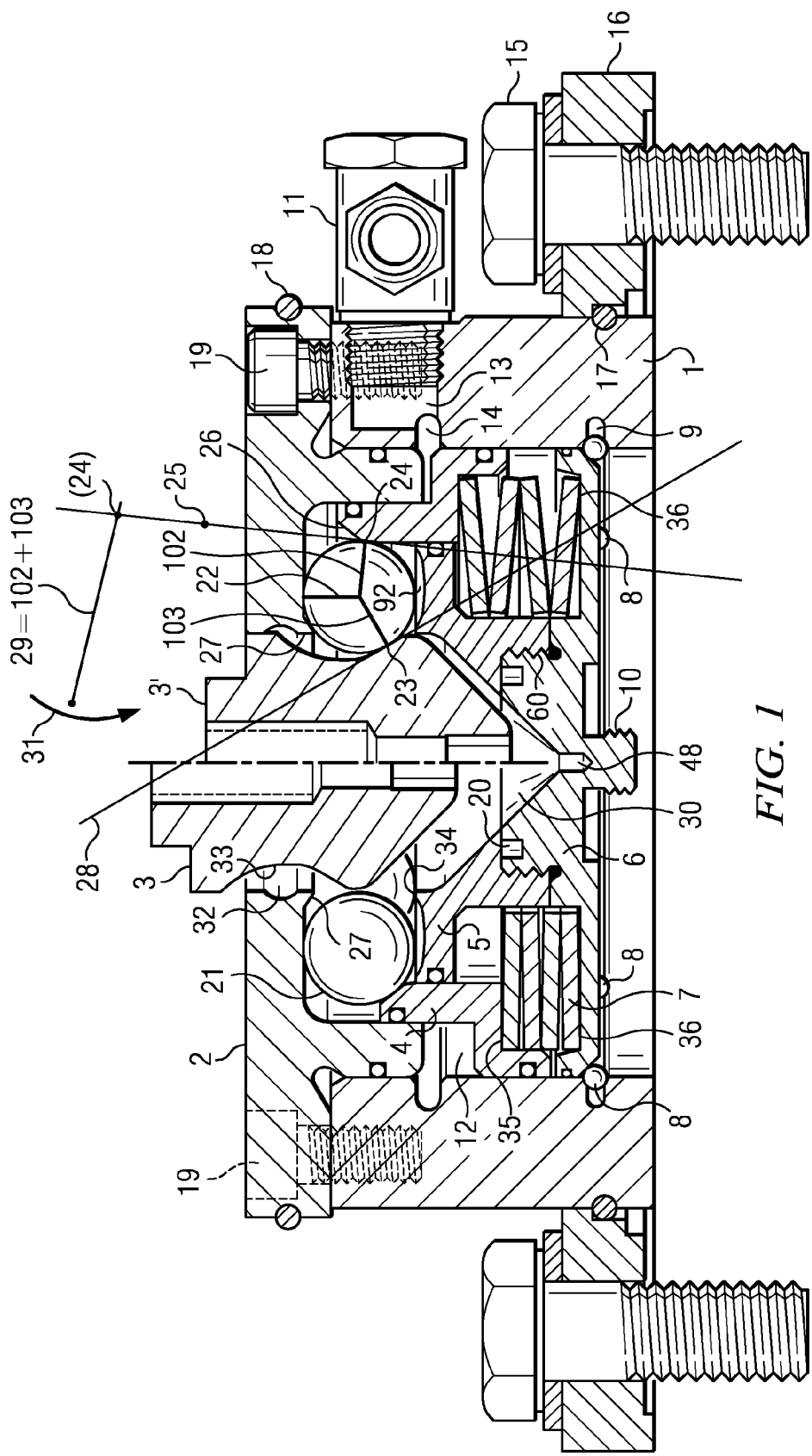

| | | |
|---|---|---|
| 2004/0026843 A1 | 2/2004 | Roth et al. |
| 2006/0186591 A1* | 8/2006 | Yonezawa et al. ............ 269/309 |
| 2007/0035076 A1* | 2/2007 | Stark .............................. 269/309 |
| 2007/0063403 A1* | 3/2007 | Stark .............................. 269/309 |
| 2007/0063404 A1* | 3/2007 | Stark .............................. 269/309 |
| 2007/0158891 A1* | 7/2007 | Stark .............................. 269/309 |
| 2007/0210501 A1* | 9/2007 | Stark .............................. 269/309 |
| 2010/0219574 A1* | 9/2010 | Stark .............................. 269/309 |

OTHER PUBLICATIONS

United States Patent and Trademark Office, "Requirement for Restriction/Election", issued in connection with U.S. Appl. No. 10/553,712, mailed on Oct. 23, 2007, 5 pages.

United States Patent and Trademark Office,"Non-Final Office action", issued in connection with U.S. Appl. No. 10/553,712, mailed on Sep. 9, 2008, 7 pages.

United States Patent and Trademark Office, "Final Office action", issued in connection with U.S. Appl. No. 10/553,712, mailed on Aug. 28, 2009, 7 pages.

* cited by examiner

QUICK ACTION CLAMPING CYLINDER WITH A SIMPLIFIED STRUCTURE

CROSS REFERENCE TO RELATED APPLICATIONS

This patent is a continuation of U.S. patent application Ser. No. 10/553,712, filed Oct. 23, 2006, which is a National Stage of International Patent Application Ser. No. PCT/EP2004/003946, filed Apr. 15, 2004, which claims the benefit of German Patent Application Serial No. DE 103 17 350.7, filed Apr. 15, 2008.

The invention relates to a quick-action clamping cylinder with a simplified structure according to preamble claim 1. A quick-action clamping cylinder of the aforedescribed type is disclosed, for example, in DE 101 18 808 A1 of the same applicant. However, this disclosed quick-action clamping cylinder does not have a simplified structure, because the ball are locked by two pistons moving against each other. A spring assembly operates on one piston, whereas the other (smaller piston) is driven by a dedicated compression spring and displaced in the cylinder space of the larger piston. Disadvantageously, this conventional design has a large number of moving parts, so that assembly and maintenance of this type of quick-action cylinder is quite complex.

As an additional disadvantage, the force of the coil spring assembly or disk spring assembly is converted to a retraction force acting on the retractable nipple only with a ratio of 1:1. The disk spring operates directly on the larger force-producing piston, and the smaller piston follows the movement of the larger force piston and moves the ball inward toward the radially inwardly supported retractable nipple with the force produced by the small spring.

Disadvantageously, if a large retraction force is desired for the retractable nipple, large-volume spring assemblies must be used, because the retraction force is weakened by the locking balls applying the force at an angle.

The conventional arrangement has the additional disadvantage that an upper pressure space formed for the pressure oil has a large retention volume and is formed on the bottom side of the cover. A large quantity of pressure oil is required due to the large retention volume. The location of the upper pressure space below the cover may also cause the pressure space to bulge the cover upwardly, which results in an inaccurate position of the workpiece palette resting on the cover.

The number of possible load change cycles is limited due to the large fill volume of pressure space, because of the oil must be completely removed from the cylinder space before a new load change.

Another quick-action clamping system is known from EP 0 827 805 B1 by the same inventor, where the force of the disk spring assembly is also converted to a corresponding retraction force for the retractable nipple with a ratio of 1:1. Disadvantageously, the relatively small-sized locking balls are subjected to shear forces when producing the downward retraction force on the retractable nipple. The locking balls have a very small insertion depth, as defined, on one hand, by the corresponding radially outer ring-shaped recess in the piston and, on the other hand, by the associated opposite ring-shaped groove on the retractable nipple. Because of the insertion depth on both sides of the locking ball in the opposing parts of the housing is relatively small, these balls are subjected to large shear forces under large locking forces. The small insertion depth of the locking balls in the associated piston causes large, radially upward and outward burst forces in the associated piston which can expand or even fracture the piston.

The small contact surfaces of the small-sized locking balls on the associated contact surfaces on the retractable nipple produce indentations on the contact surfaces on the retractable nipple after longer operating times of the clamping system, which can change the retraction force.

The undesirable indentations caused by the locking balls on the outside periphery of the retractable nipple can even remove material in the form of chips, which can adhere to the retractable nipple and can prevent the retractable nipple from being pulled out of the central opening in the clamping cylinder.

To address the aforedescribed problems, the piston and the retractable nipple of the conventional clamping cylinder were fabricated entirely from a high-hardness tool steel, which tends to be a rather brittle material and is expensive to manufacture.

It is therefore an object of the invention, to modify the basic clamping system disclosed in DE 101 18 808 A1 so as to increase the retraction force with significantly smaller springs, while simultaneously reducing the stress on the material of the contact surfaces between the locking balls and the associated surfaces in the clamping cylinder.

The object of the invention is solved by the technical teachings of claim 1.

As an important characteristic feature of the material, the clamping system according to the invention consists essentially of a piston which is displaceably and sealingly guided between the surfaces of the cover and the housing. The piston has radially inner, slightly sloped chamfers, with which the locking balls make contact in a load-transmitting fashion. In another ball position, the locking balls contact the bottom side of the cover, and contact in a third ball position an oppositely sloped chamfer disposed on the outer periphery of the retractable nipple.

The piston is pre-biased in its locked position in a conventional manner by a spring assembly. The spring assembly can include disk springs, coil springs or other resilient force reservoirs. A corresponding counterpressure can also be produced by a fluid or a gas, instead of by a spring assembly.

It is an essential feature of the invention that the balls now contact two chamfers oriented in opposites directions, i.e., on one hand, a chamfer disposed on the piston, which urges the ball against the bottom side of the cover and, on the other hand, an opposing chamfer of the outer periphery of the retractable nipple, which is sloped opposite to the aforementioned chamfer on the cylinder.

This results in a lever action of the spring force acting on the piston. The first-mentioned sloped surface on the piston has, for example, an angle of 3° to 6°, preferably 5°, so that the slope is relatively small and is in the self-locking range, because it is below the self-locking limit of 7°.

When the spring force is applied to the piston in the displacement direction, the ball is entrained by the chamfer having the small slope and contacts the bottom side of the cover with the entire spring force of the spring assembly. This contact position is spaced in the radial direction from the contact position of the ball on the cylinder. This produces a first lever arm which continues beyond the contact point of the ball on the bottom side of the cover to a second lever arm, which in turn terminates on the chamfer of the retractable nipple.

Because of the two chamfers are sloped in opposite directions, the force of the spring assembly is in effect transferred to the retractable nipple as a corresponding retraction force with a ratio of, for example, 1:6. The locking balls act as a lever arm and convert the force of the disk springs into a larger retraction force on the retractable nipple.

It is now possible for the first time to produce a very high retraction force with relatively small disk assemblies, so that the housing for the same retraction force can be much smaller than in conventional systems, because the spring assemblies can have a much smaller size.

It is also important that the locking balls can now have a large size, because the housing provides more interior space, and because the balls are unconstrained and no longer require a cage.

Importantly, the balls are no longer exposed to shear forces, but only to compression forces.

The balls assume a stable three-point support, because the radially outer section of each ball contacts the inside of the piston, whereas the vertically upper section contacts the bottom side of the cover and the radially inner section contacts the outer surface of the retractable nipple. This stable position defined by three ball positions produces a uniform force of the balls, so that the balls they need no longer be made of an expensive material, because significantly smaller ball pressure forces are produced.

Accordingly, the balls can be manufactured from a relatively low-quality case-hardened steel. Only the outer periphery of the balls needs to be hardened, whereas the inner core can be made of a relatively soft metallic material. The balls themselves are then advantageously elastically deformable to a certain extent and can also elastically deform because of the three-point support. If the retraction forces are asymmetric or the load is distributed asymmetrically over the workpiece palette, then the elastic deformation of the various locking balls can compensate canting forces in certain peripheral regions on the retractable nipple, because the elastic deformation causes the balls to orient themselves uniformly and become centered on the outer periphery of the retractable nipple.

Manufacturing tolerances of the clamping system (for example in the production of the piston) are also compensated by the partial elastic deformability of the balls, which are automatically centered in the region of the three-point support on the retractable nipple.

Automatic centering of the locking balls on the outer periphery of the retractable nipple is also facilitated by providing on the piston a ring-shaped projection which is unsupported on one side and which the locking balls contact to transfer the load. When large locking forces are applied, the ring-shaped projection of the piston which points upward on one side, can locally expand in a tulip-like shape along the periphery of the piston. This also centers the locking piston of the locking balls. On the other side, the annular tulip-shaped projection of the piston has a relatively small cross-sectional thickness and extends along a thicker cover projection of the cover, thus providing a stable support surface for the piston on the cover.

Because the lever transmission ratio provides a mechanical advantage of 1:6.5, retraction forces in a range of 20,000 N can be achieved with a significantly smaller housing for the quick-action clamping cylinder and smaller disk springs. Conventionally, retraction forces of only approximately 6,722 N are achievable with larger disk springs and larger housing diameters.

In addition to using the lever force of the locking balls, the invention is also based on the observation that the balls can also be used to provide automatically centering on the retractable nipple, because corresponding material deformations are explicitly permitted.

With the invention, the retractable nipple is completely positively locked due to the three-point support of the locking balls. The aforementioned, relatively small slope of the chamfer on the piston results in self-locking of the locking balls in the locked state. The locked retractable nipple can then no longer be pulled upwardly out of the quick-action clamping cylinder against the applied retraction force.

In conventional systems, the retractable nipple can still be pulled out of the housing of the quick-action clamping cylinder against the applied spring force by a small displacement of, for example, 2 mm, even if the retractable nipple is locked. This is possible because the locking balls are supported in a ball cage which, when the locking force is exceeded, makes contact with an associated surface on the housing only after being displaced over a certain distance.

As another advantage of the invention, the balls are in a self-locked state due to the small-slope chamfer on the piston. Even if one spring of several disk springs uniformly arranged along the periphery breaks, the locked state can still be maintained. The locked state is maintained, because each ball is in self-locking engagement.

In conventional systems, when one or several springs break, the locking force is immediately removed and the retractable nipple can be pulled out of the cylinder housing against the (removed) locking force.

As another advantage of the invention, the clamping system of the invention has a surprisingly small number of parts. The number of parts is further reduced by combining several parts to a so-called built-in module. The spring assembly is combined with the lower section of the clamping system and the ball support to a so-called built-in module. The clamping system can then also be installed in an overhead location or vertically, which is impossible with conventional systems. Conventionally, the disk springs had to be inserted very precisely in the interior space of the housing with the cover removed, before the cover could be closed. Accordingly, a vertical or overhead installation is then not possible, because the disk springs cannot be uniformly positioned along the periphery in the housing and accurately attached, due to their tendency to move around before the cover can be screwed on.

Advantageously, the built-in modules can be preassembled, which simplifies installation and allows a faster exchange.

Large locking balls in conjunction with the three-point support in the quick-action clamping system can advantageously also reduce the likelihood of a system failure. In conventional systems, the locked position had to be monitored because it was not possible to identify if the retractable nipple was locked or not. The locking balls in conventional systems may hence already have attained their locked position, while the retractable nipple is still not inserted in the center opening. The balls then did not engage on the outer periphery of the retractable nipple, and it was erroneously assumed that the retractable nipple was already locked. Accordingly, to prevent faulty operation, extensive safety measures had to be implemented to identify when locking failed (locking inquiry).

Such locking inquiry is not necessary with the invention. For example, if the pressure oil for operating the piston is missing and if the piston is in the locked position, where the balls are moved radially inwardly into the center opening of the clamping system, then according to the invention, the retractable nipple cannot be moved into the center opening of the clamping system. The retractable nipple makes contact with the outside periphery of the radially inner large-volume locking balls, but is unable to move past the locking balls, so that an apparent locked position cannot be attained.

The large insertion depth of the locking balls projecting into the center opening of the housing prevents the retractable nipple from moving into the locked position, so that the retractable nipple cannot move farther into the housing.

The subject matter of the present invention is not only recited in the individual claims, but can also be derived from the combination of the various claims.

All elements and features described in the specification, including the abstract, in particular the three-dimensional configuration illustrated in the drawings, are to be considered part of the invention, if they are severally or in combination novel over the present state-of-the-art.

Several embodiments of the invention will now be described with reference to the drawings. The drawings and corresponding description discloses additional features and advantages of the invention.

Figure 2:
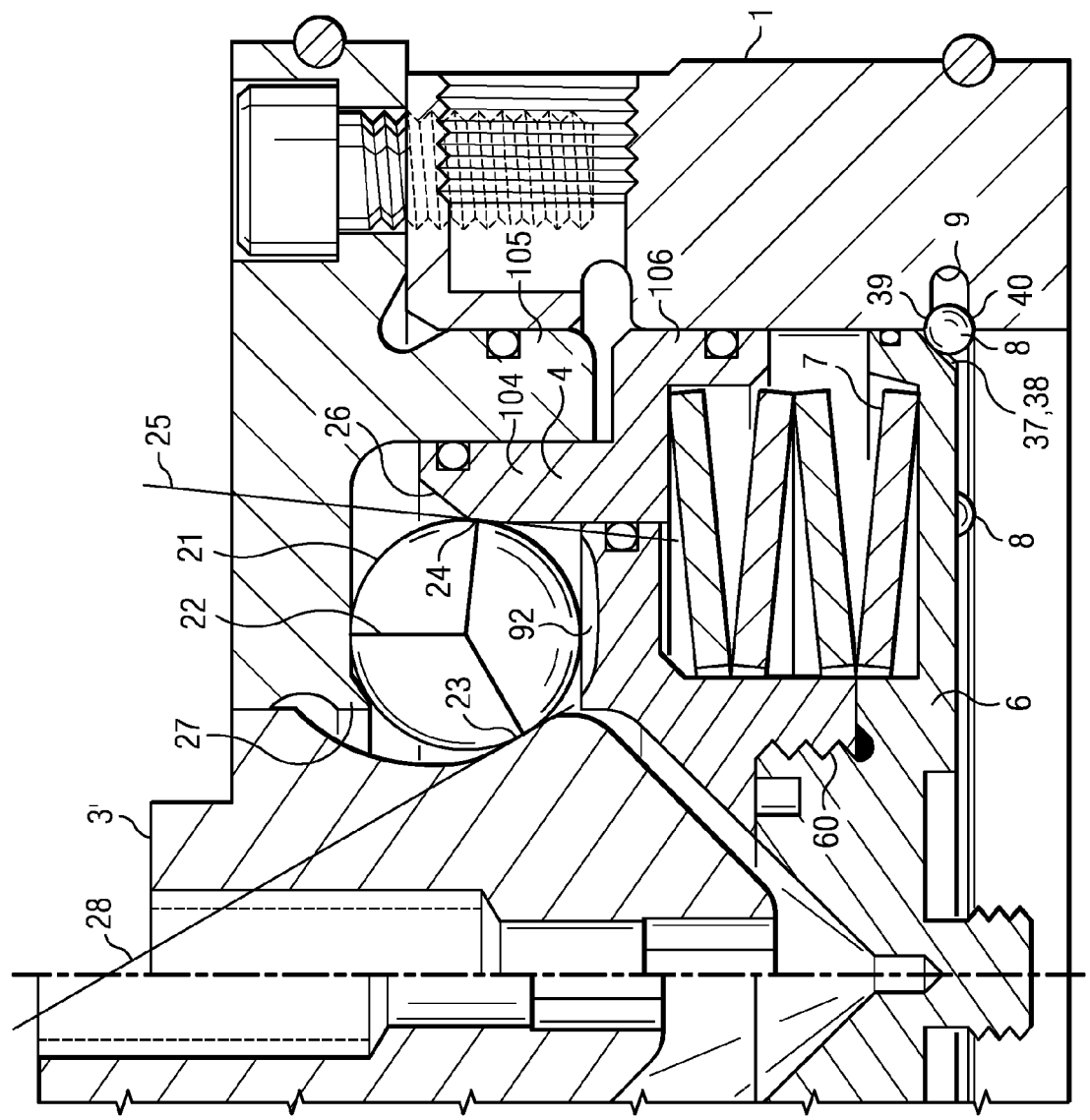
Figure 3:
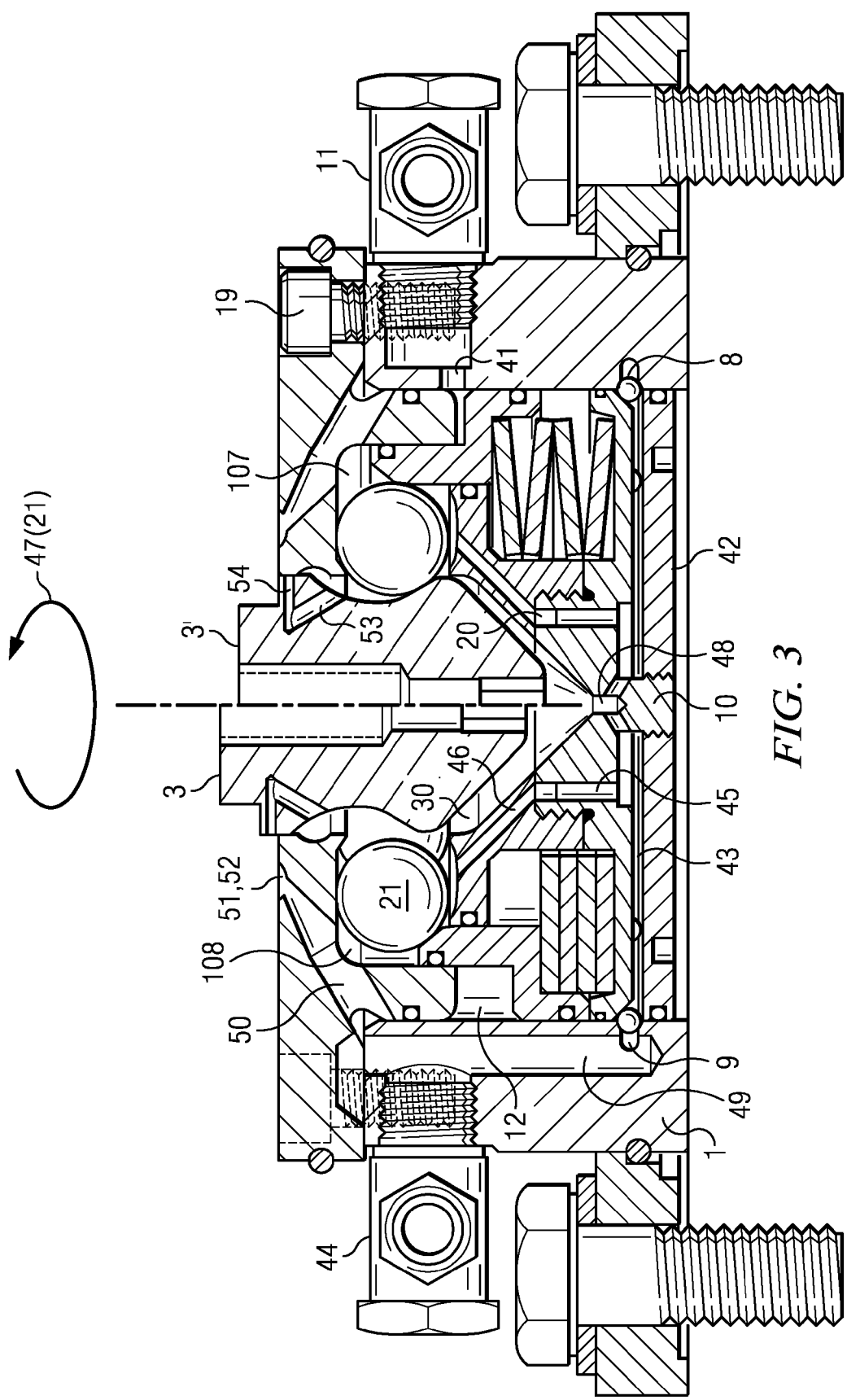
Figure 4:
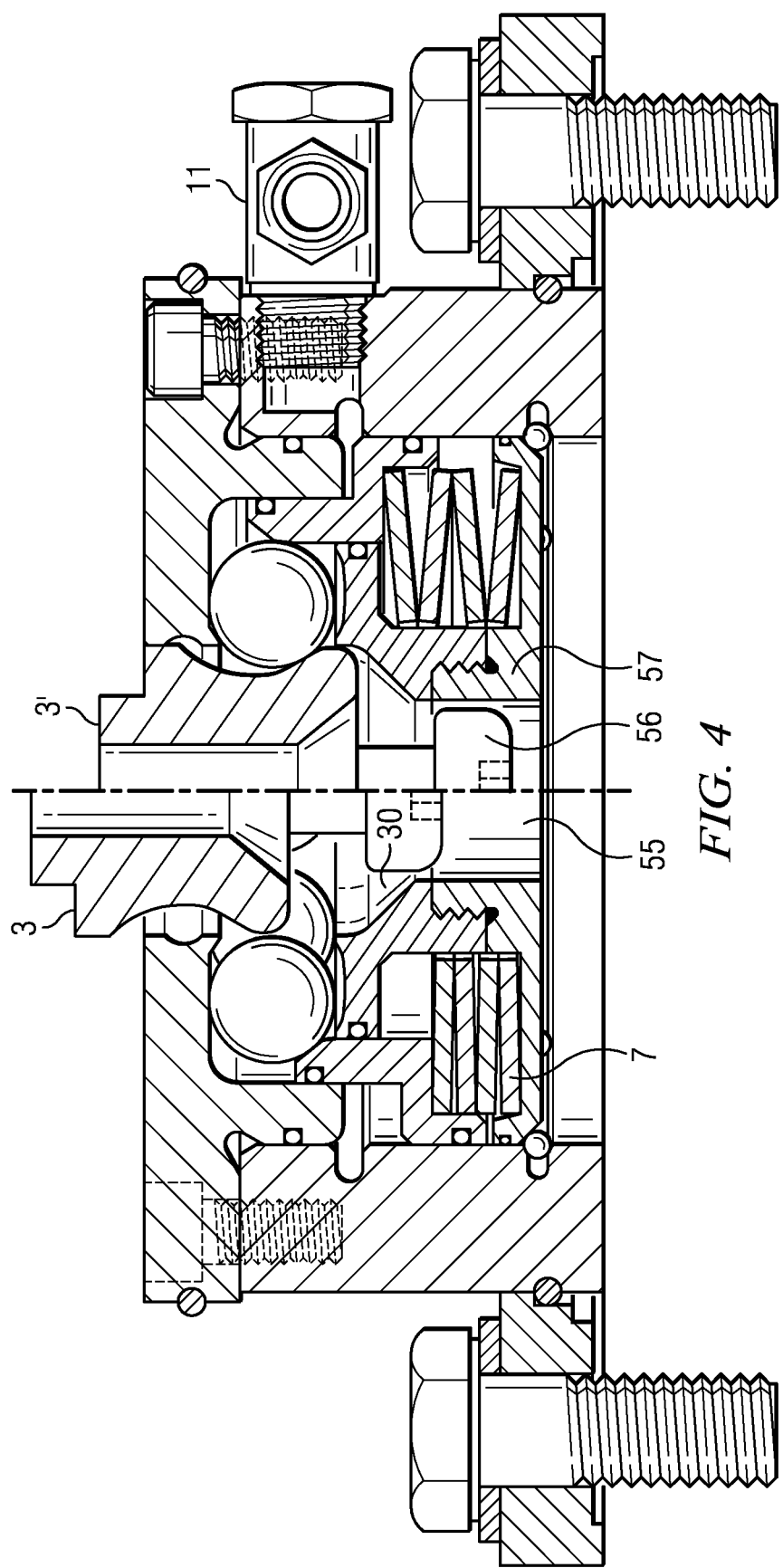
Figure 5:
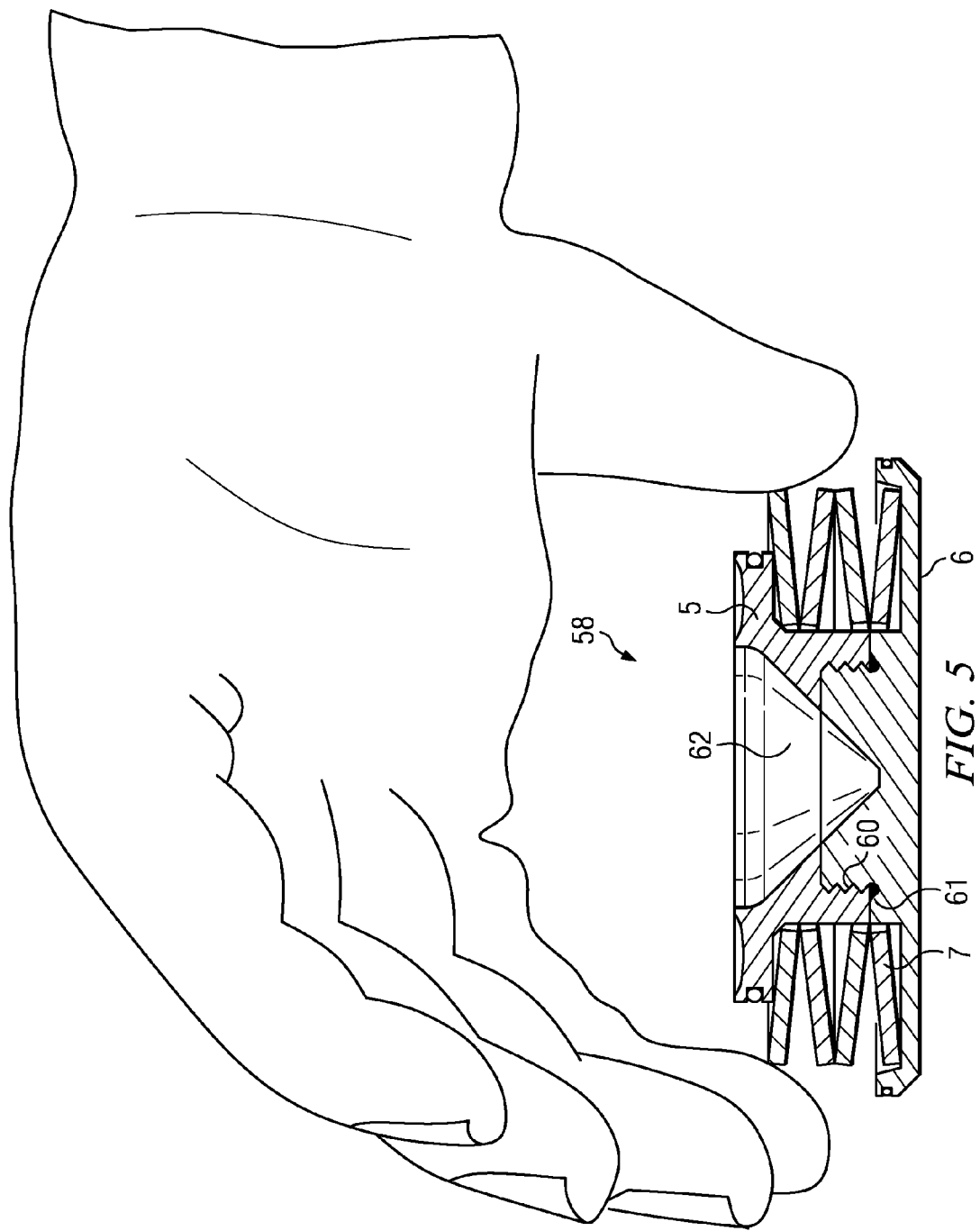
Figure 6:
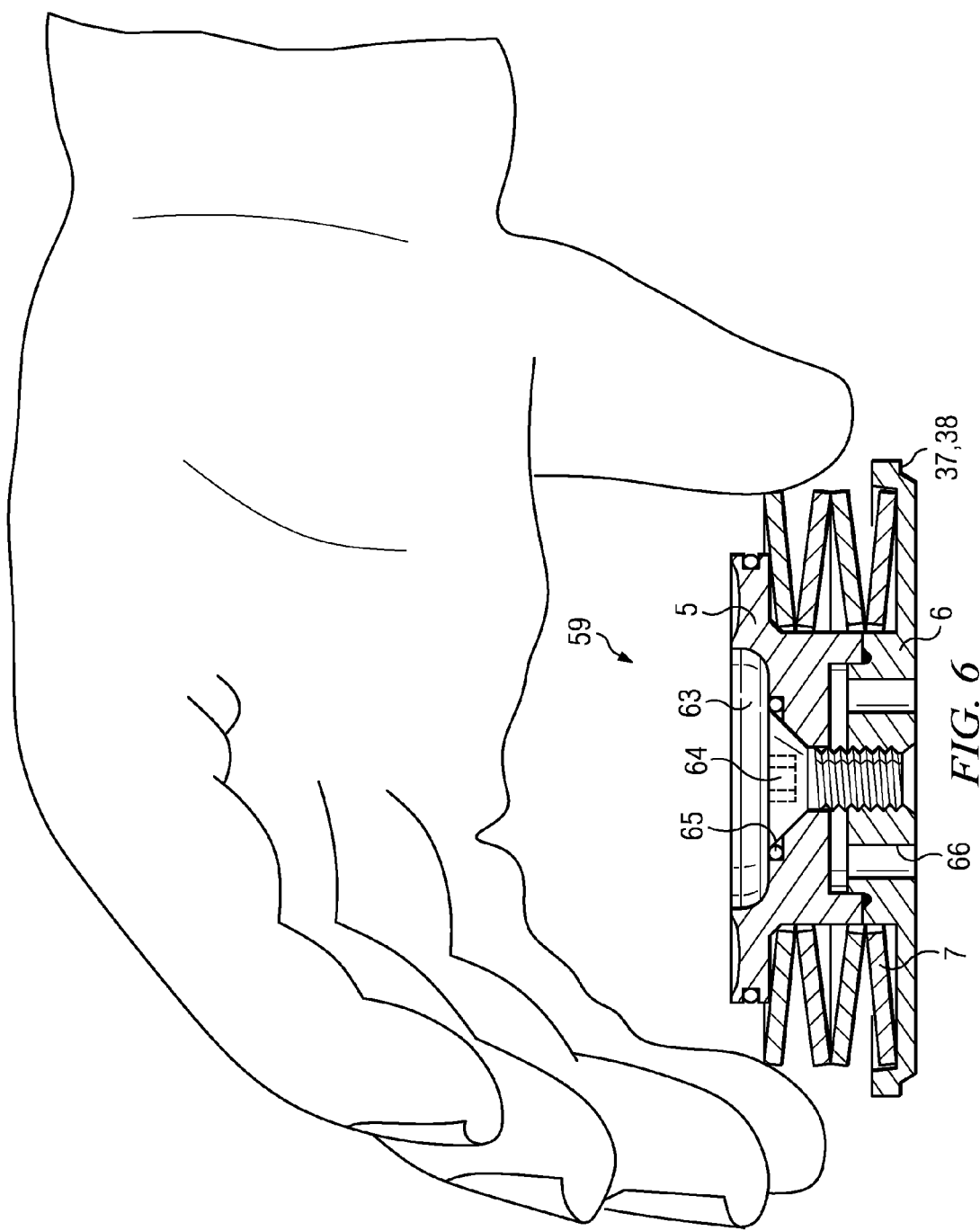
Figure 7:
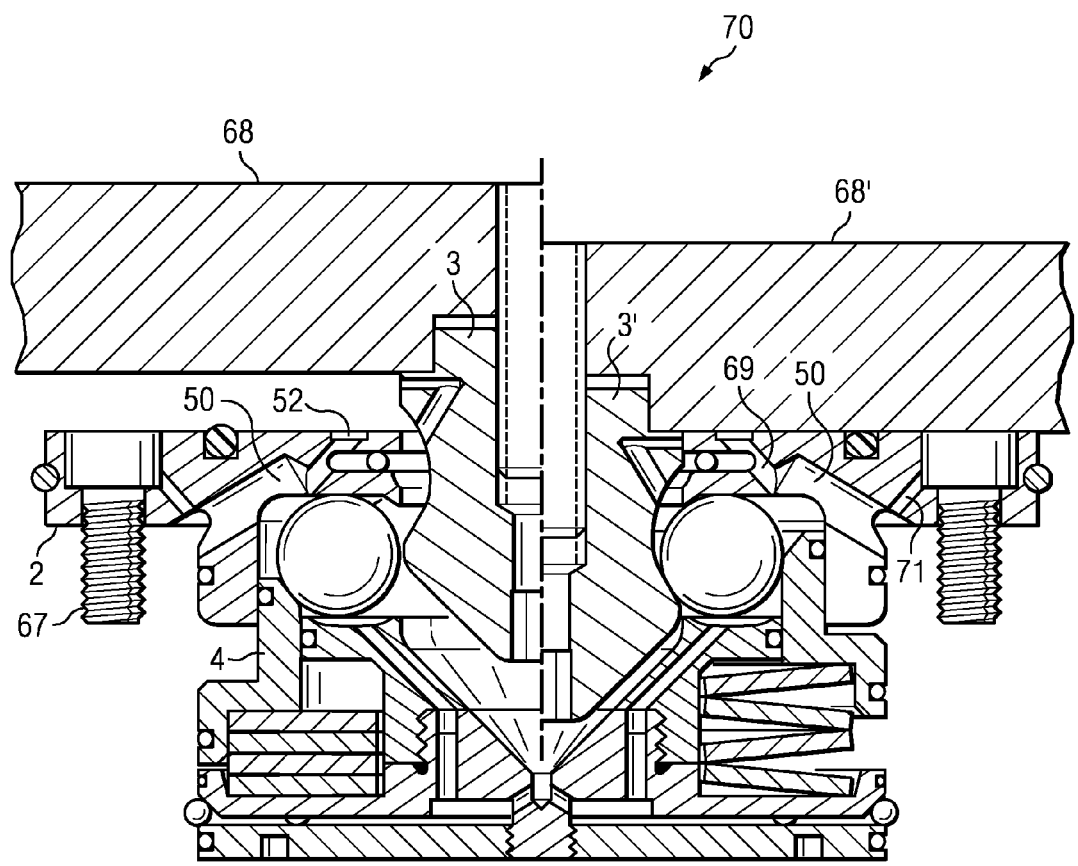
Figure 8:
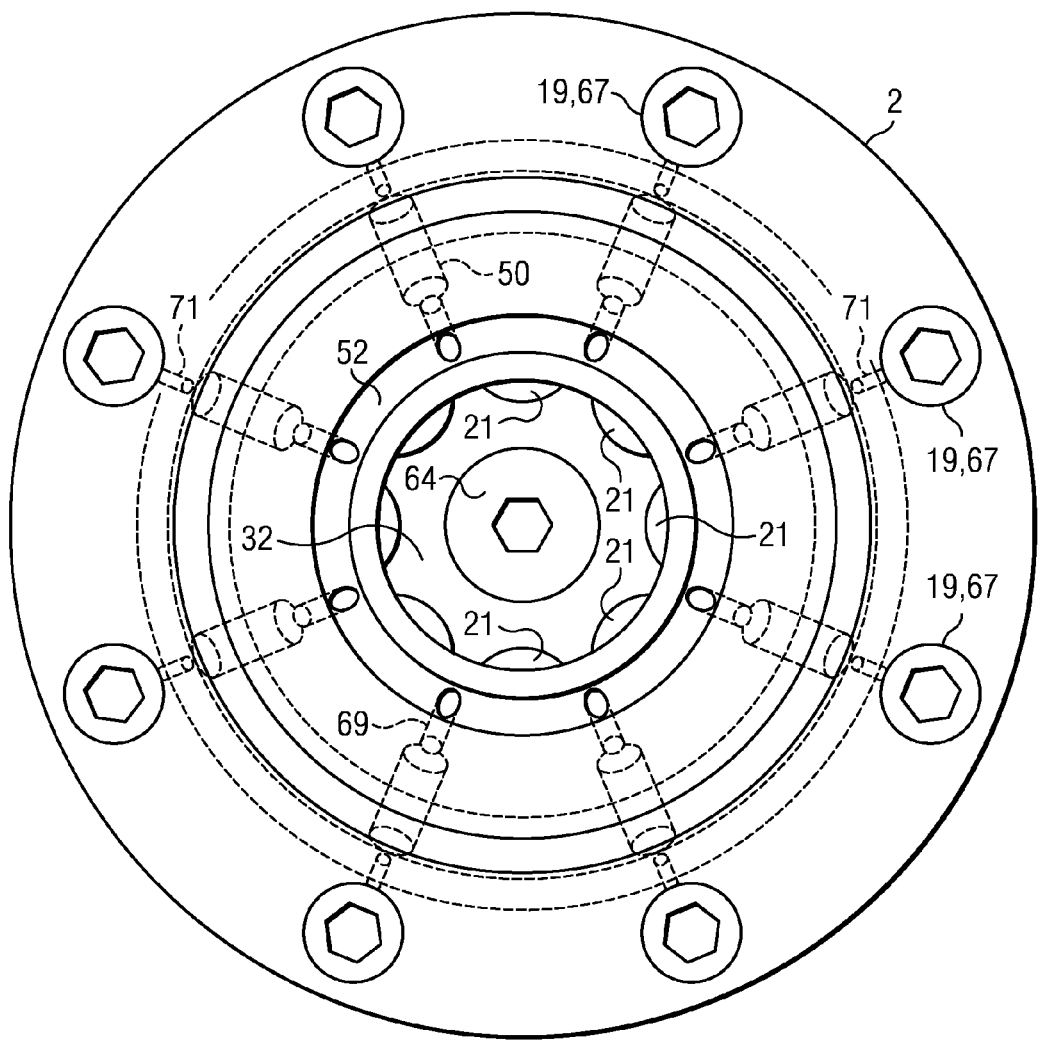
Figure 9:
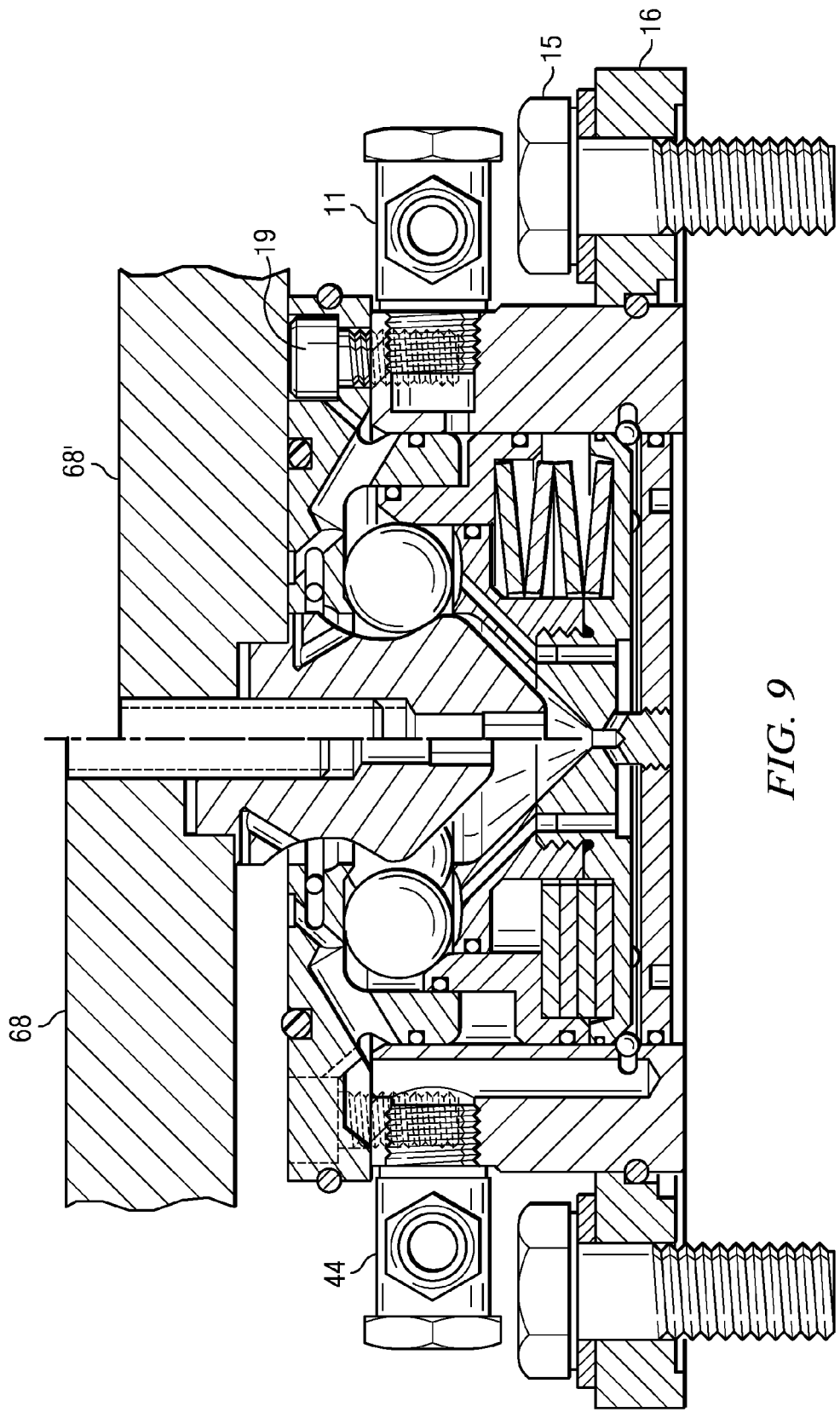
Figure 10:
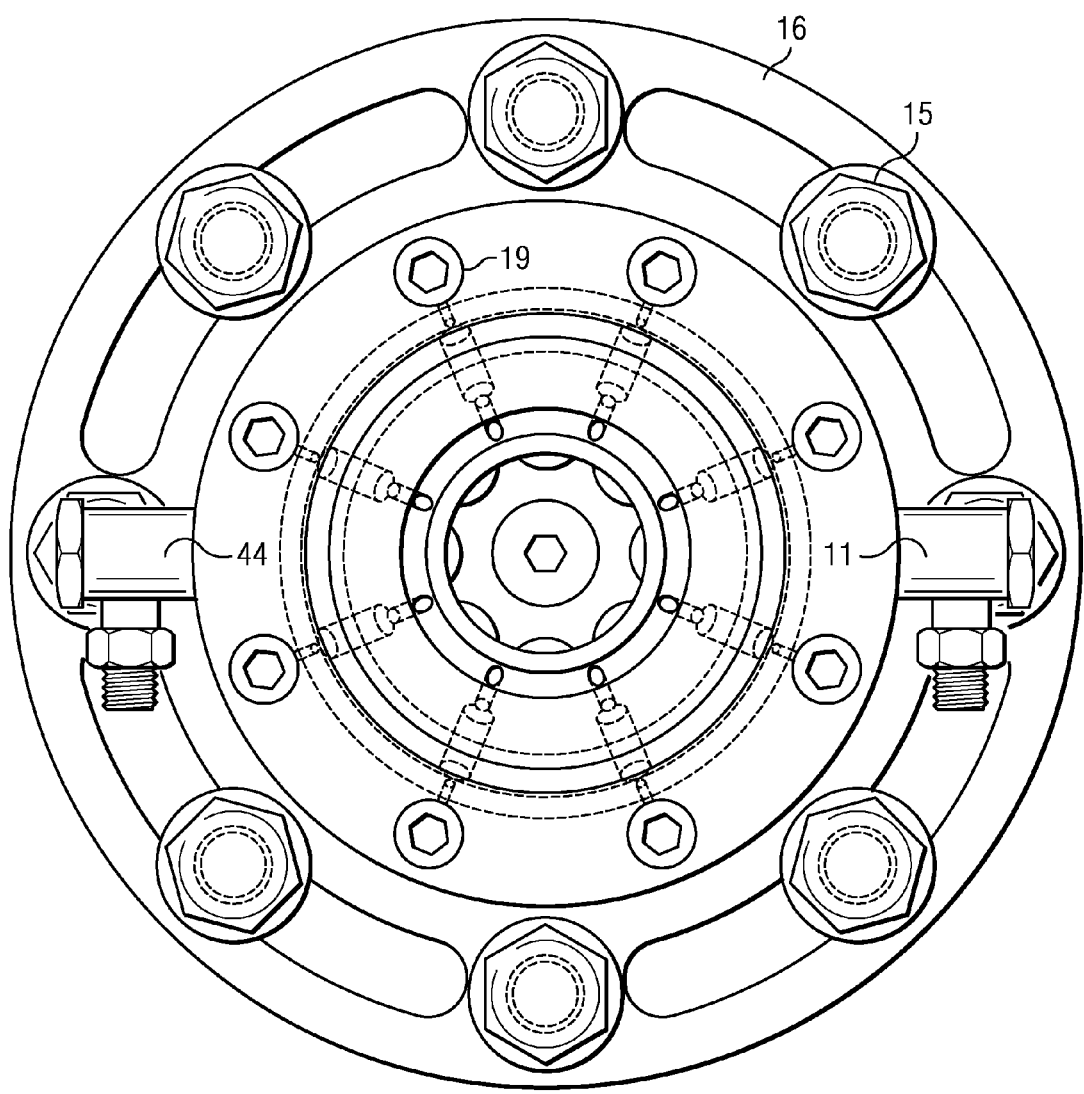
Figure 11:
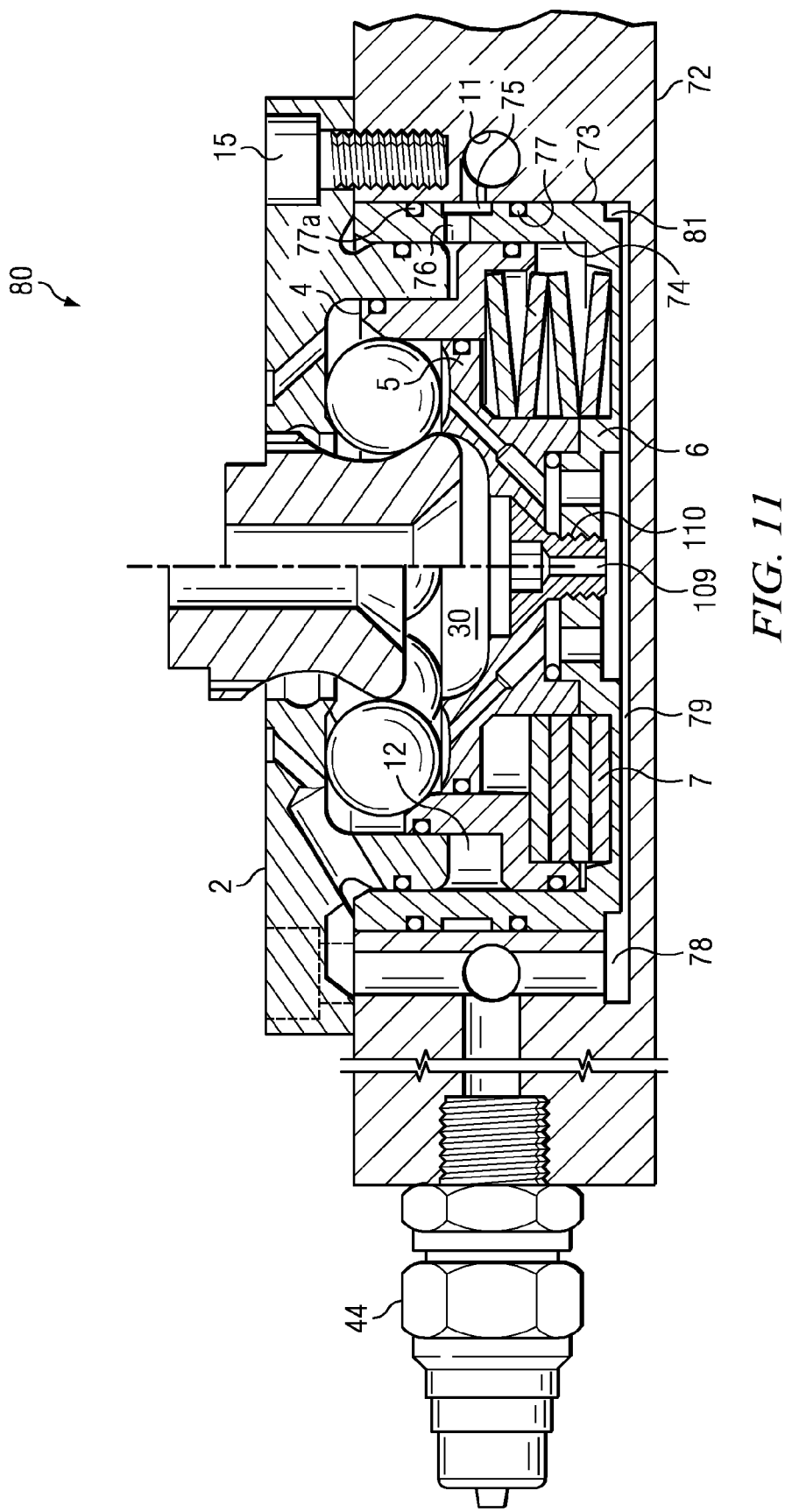
Figure 12:
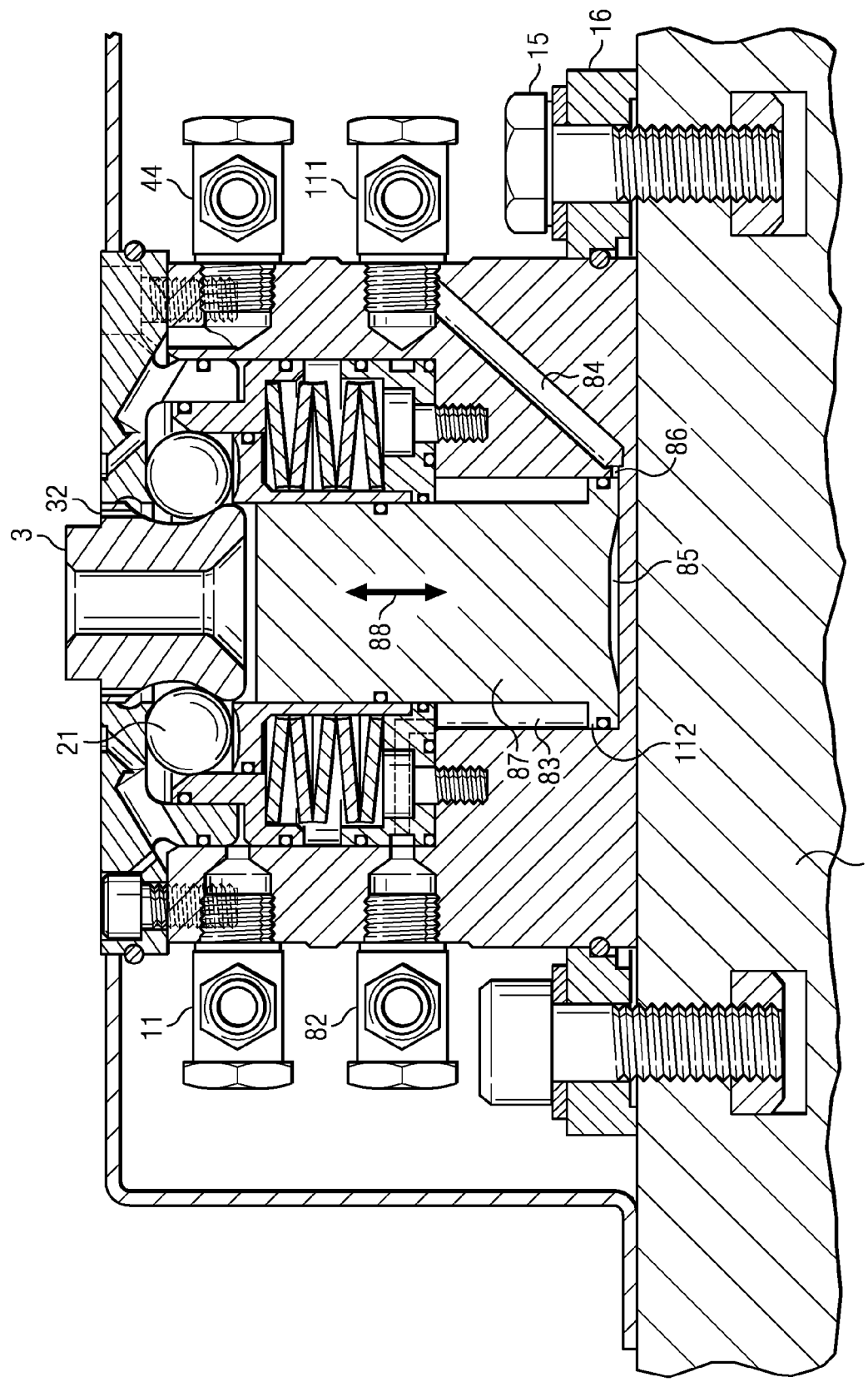
Figure 13:
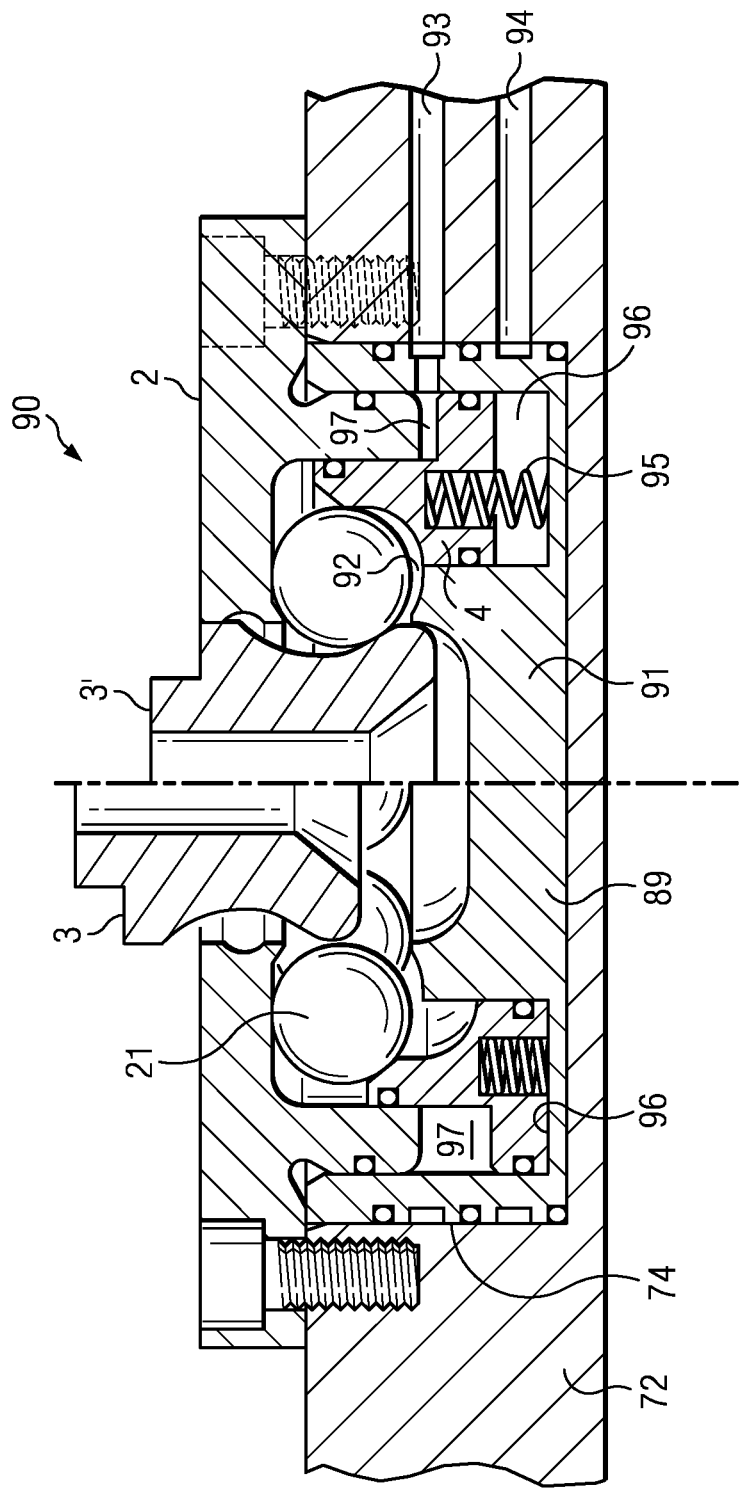
Figure 14:
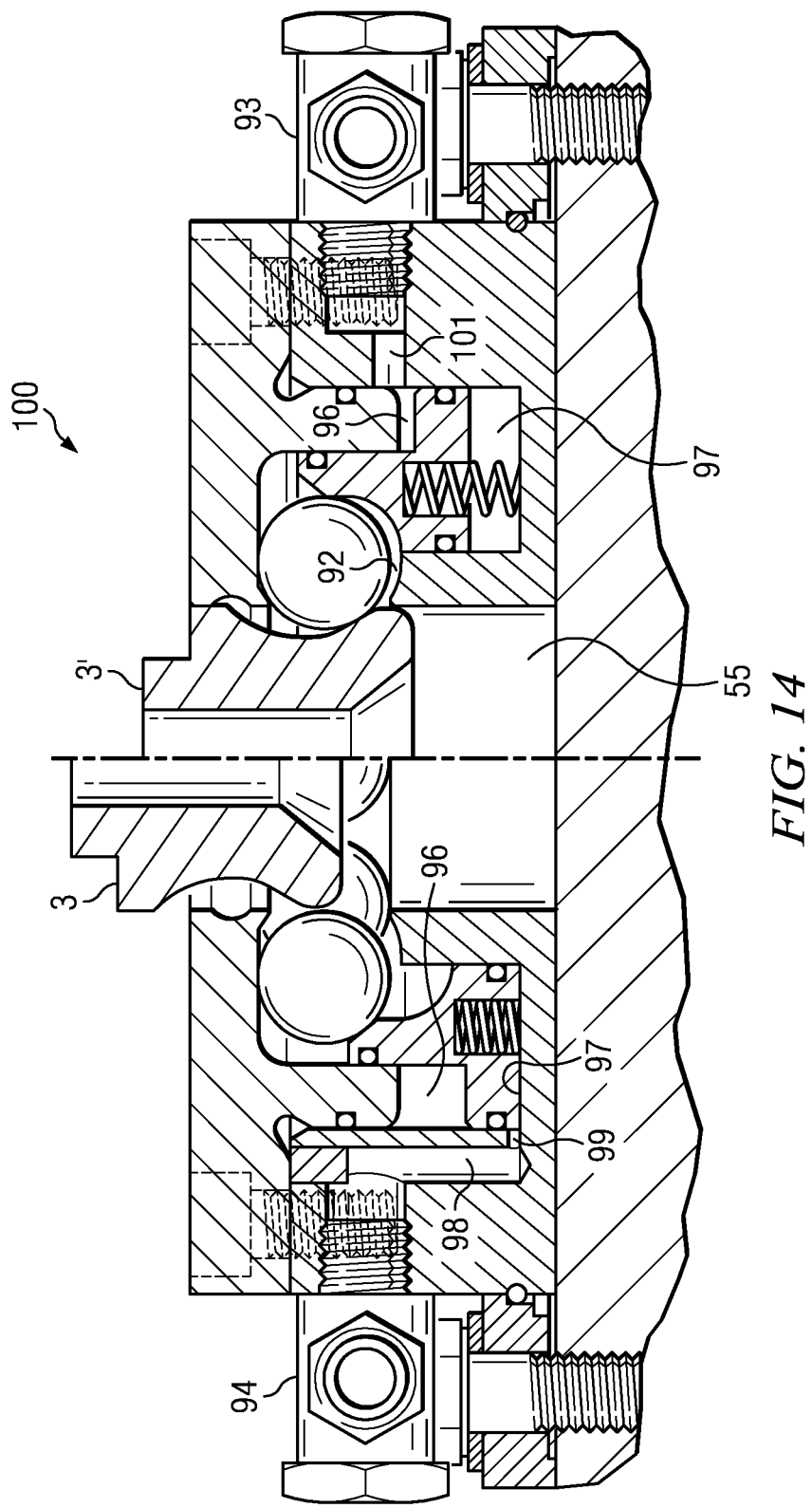

It is shown in:

FIG. 1 a cross-sectional view of a first embodiment of a quick-action clamping cylinder according to the invention;

FIG. 2 a detail of the arrangement of FIG. 1;

FIG. 3 a cross-sectional view of a second embodiment of a quick-action clamping cylinder with blow-out air;

FIG. 4 a cross-sectional view of another embodiment of a quick-action clamping cylinder with an unobstructed center bore, which can be used as fluid drain or inlet for blow-out air;

FIG. 5 a cross-sectional view through the first embodiment of a built-in module;

FIG. 6 a cross-sectional view through a second embodiment of a built-in module;

FIG. 7 a cross-sectional through a built-in module of a quick-action clamping cylinder, which can be inserted into an associated opening in a machine table or a clamping plate;

FIG. 8 a top view of the arrangement of FIG. 7 with the workpiece palette removed;

FIG. 9 the same diagram of a quick-action clamping cylinder as illustrated in FIG. 3, with an added workpiece pallet;

FIG. 10 a top view of the arrangement of FIG. 9 and FIG. 3, with the workpiece palette removed;

FIG. 11 a cross-sectional through another embodiment of a quick-action clamping cylinder in form of a built-in cartridge;

FIG. 12 a cross-sectional through another embodiment of a quick-action clamping cylinder with a central ejector;

FIG. 13 a cross-section through another embodiment of a quick-action clamping cylinder in the form of a built-in cartridge with two different pressure connections; and FIG. 14 a modified embodiment of FIG. 13 as a surface-mounted cylinder.

FIG. 1 shows a general schematic diagram of a quick-action clamping cylinder, which preferably includes a tubular housing 1, which is mounted on a machine table or a clamping plate (not shown) with screws 15 and an associated tensioning ring 16. The tensioning ring 16 is connected to the tubular housing 1 by a safety ring protruding into both parts.

The quick-action clamping cylinder has an upper cover 2 with supports screws 19 which are uniformly distributed along the periphery and used to secure the cover 2 on the top side of the tubular housing 1. The upper safety ring 18 on the cover 2 serves as a stop for a corresponding sheet metal cover for covering the top side of the quick-action clamping cylinder.

The retractable nipple 3 is inserted into the center opening 32 of the quick-action clamping cylinder from above, as shown in two different clamping positions. In the right-hand partial cross-section, the retractable nipple 3' is shown in the locked position, whereas the left-hand partial cross-section shows the unlocked state of the locking system.

The locking system is essentially formed by a piston 4, which according to FIG. 2 is formed as an offset tubular part with an upper unsupported ring-shaped projection 104, which transitions via an offset into another radially outer ring-shaped projection 106, which is sealingly guided on corresponding interior surfaces of the tubular housing 1.

The outside of the piston 4 sealingly contacts via corresponding sealing rings a corresponding cover projection 105, which is also unsupported and is thick enough to prevent bending. The ring-shaped projection 104 of the piston 4, on the other hand, can be partially deformed in the radially outward direction.

The locking balls 21, which are uniformly distributed along the periphery, are supported on the bottom on corresponding radial ball raceways 92 of a ball support 5. The ball support forms in the radially inward direction a corresponding circumferential, approximately lobe-shaped, upwardly oriented ball support 34 for securing the position of the locking balls 21.

The locking balls are also held captive on the cover inside of the cover 2 by corresponding ball mounts 27, whereby both the ball mounts 27 and the ball mounts 34 do not transfer loads.

In the locked state, the ball supports 27 make neither contact and nor do they transfer loads.

The ball support 5 is connected via a thread 60 with a lower spring support 6, with both parts forming a built-in module.

Importantly, the two parts form a circulatory receiving space for the springs 7 which are uniformly distributed along the periphery.

It is also important that each spring 7 contacts in the radial outward direction a corresponding radially outer upper spring support surface 35 on the bottom side of the piston 4 and also rests on a radially outer lower spring support surface 36 of the spring support 6.

The radially outer spring support surfaces 35, 36 prevent undesirable bending of the bottom of the spring support 6. The radially outer upper spring support surface 35 is advantageously in approximate alignment below the cylinder space 12, so that the cylinder space 12 is not deformed when the locked position is released.

The lower spring support is fitted in the tubular housing 1 by locking balls 6 uniformly distributed along the periphery. According to FIG. 2, the locking balls 8 contact the sloped chamfers 37 on the spring support 6, with corresponding grooves guiding the locking balls 8 arranged in the region of the chamfer 37.

The grooves 38 are uniformly distributed along the periphery and match the number of the employed locking balls 8 to prevent the locking balls from moving in the circumferential direction.

On the opposite side, the locking balls 8 contact a lower radius 40 in the region of the tubular housing 1 and also a radius 31 oriented in the opposite direction in the region of the tubular housing 1. The chamfer 37 thereby urges the locking balls 8 into the two opposing radii 39, 40, providing an absolutely secure connection for transferring large loads between the inner built-in module of the locking system and the tubular housing.

A radially outer circumferential recess 9 is provided for guiding the blow-off air. This type of air feed will be described below.

A cylindrical threaded section 10, which can be connected with a cover and will be further described below, is formed on the bottom side of the spring support 6.

A pressure medium is introduced into the interior space of the tubular housing 1 via a pressure connection 11, whereby any suitable material in conformance with the general description may be selected as the pressure medium. For sake of simplicity, the following description refers to a pressure oil or hydraulic oil, although the invention is not limited thereto.

The pressure oil is introduced via the pressure connection 11 into a corresponding blind hole 13, which is in fluid connection via a ring-shaped recess 14 with the cylinder space 12. The pressure oil is supplied to the piston 4 via this cylinder space. Importantly, a very small-volume cylinder space 12 is produced, on one hand, by the cover projection 105 of the cover 2 and, on the other hand, by the offset in the piston 4, so that only very small fill quantities are required. Because the small volume of the cylinder space 12, loads can be changed rapidly without unintentional disadvantageous deformation of the cover by the supplied oil, because pressure space has an increased cross-sectional thickness in the region of the cover projection 105.

Advantageously, the cylinder space 12 is then also arranged farther outward in the tubular housing 1, namely proximate to the radially outer screws 19 between the cover 2 and tubular housing 1. Deformation forces applied to the cover are then advantageously absorbed by the screws 19.

The transition region in the cover between the downwardly extended cover projection 105 and the material of the cover, through which the screws 19 extend, can thereby be made strong and is capable of transferring large loads without deformation.

Because the cover needs to be thicker only in the radially outer region (beyond the locking balls 21 and the piston 4), the cover can have a reduced thickness in the inner region, so that the locking system installed in this region can have a smaller size.

For example, while the radially outer thicker region of the cover has a thickness of, for example, 10 mm, the thickness decreases to only approximately 7 mm in the region of the locking balls 21. This region of the locking system can hence be equipped with large locking balls capable of transferring large loads. The overall installation height of the entire quick-action clamping system can then be significantly reduced compared to conventional systems.

The mechanical advantage of the lever transmission of the locking force from the springs 7 to the retractable nipples 3, 3' will now be described in detail with reference to FIGS. 1 and 2.

As indicated to FIGS. 1 and 2, each locking ball 21 makes contact in a radially outer position 24 with a corresponding slightly sloped chamfer 25 on the inner periphery of the piston 4. The slightly sloped chamfer 26 continuous in the axial direction to a chamfer 26 with a greater slope.

The chamfer 26 with the greater slope is used to apply a so-called rapid lift. During the transition from the locked position to the unlocked position, each locking ball should be moved as quickly as possible outwardly across the chamfer 26 with the greater slope into the unlocked position. The locking ball 21 is then quickly moved out of the region of the (force) chamfer 25 by a corresponding released stroke, so that the locking ball 21 immediately reaches the chamfer 26 with the greater slope and disengages from the retractable nipple 3.

The mechanical advantage of the lever is achieved by urging the springs 7 initially against the bottom side of the piston 4 in the region of the spring support surface 35. This pressing'force is transferred via the tubular ring-shaped projection 104 of the piston to the chamfer 25 with the smaller slope, where the balls make contact in a corresponding position 24. The spring force is now transferred at the position 24 via the level arm 102 to the upper ball support point on the bottom side of the cover 2 at position 22, where each locking ball is supported, forming another level arm 103, which terminates on the inner periphery of the retractable nipple 3 with the ball supported at position 23.

Each locking sphere 21 forms a lever 29 resulting from the combination of the two level arms 102 and 103. This makes it possible for the first time to transfer the spring force of the springs 7 at position 24 with a ratio of, for example, 1:6.5 to the corresponding position 23 on the outer periphery of the retractable nipple 3. The retractable nipple 3 is then pulled into the central interior space 32 of the housing of the clamping system by a retraction force which is enhanced by a factor of 6.5.

The chamfer 28 of the retractable nipple 3 has a greater slope than the chamfer 25 on the piston 4. The large slope of the chamfer 28 generates a very large and stable retraction force, so that each locking ball enters the associated unlocked position 33 of the retractable nipple 3 with a large insertion depth.

Conventional locking balls have a diameter of 5 mm, which results a usable surface of approximately 78.54 mm$^2$.

With the present invention, balls with a diameter of, for example, 14 mm can be used which results in a usable ball surface of 615.75 mm$^2$. Accordingly, the surface is increased by 784%, which is one reason for the aforedescribed advantages.

In addition to the elastically deformable ball surface, the locking balls 21 also have a very large insertion depth into the central unlocked position 33 on the retractable nipple 3. This prevents material shearing or material removal in the region of the chamfer 28, because the chamfer 28, unlike in conventional systems, has a relatively large angle with respect to the vertical direction.

In conventional systems, the workpiece pallet connected with the retractable nipple 3 may inadvertently be pulled out in the locked position against the retraction force, which can cause severe damage to the material in the region of the chamfer 28. This is prevented by the invention, because the balls that contact the chamfer 28 have a large surface and a large retraction force, preventing damage to the chamfer 28.

The conical tip of the retractable nipple 3 engages with the center interior space 30 in the clamping cylinder, whereby the space can also be open to the bottom, as will be described below.

The direction of the arrow 31 on the lever 29 in FIG. 1 also shows that the lever 29 tilts, i.e., that the lever force is transferred in the direction of the arrow 31 from the piston 4 to the outer periphery of the retractable nipple 3.

The interior space 30 can also provided with blow-off air. To this end, a vertically oriented bore 48, which is open on one side and whose function will be described below, is arranged in the spring support 6. The ring-shaped recess 20, described below, is disposed on the topside of the spring support 6 to deflect the air.

FIG. 3 shows an embodiment which is slightly modified from FIG. 1, and includes novel air pathways for blow-off air.

A corresponding gas, compressed air or a coolant are introduced into the tubular housing 1 through the air connection 44, from where the reach through an ascending vertical bore the lower region of the tubular housing 1, where the pressure medium enters the annular recess 9.

As described above, a cover 42 is screwed onto the thread 10, producing a gap 43 between the bottom side of the spring support 6 and the inside of the cover 42 for guiding the pressure medium. The pressure medium flows, in one hand, via a recess 9 arranged on the outside periphery and, on the other hand, into the center region, where it enters via the gap 43 associated vertically ascending bores 45. From there, the compressed air moves via the aforementioned circular groove 20 and from there again via upwardly sloped grooves 46, which terminate in the ball raceways 92. In this way, the ball raceways 92 are cleaned by the blow-off air.

It is important for guiding the air that the sloped bore 46 has not only an angle relative to the vertical in the drawing plane of FIG. 3, but also perpendicular to the drawing plane of FIG. 3. In this way, an air current which impinges the bottom side of the locking balls 21 at an angle is directed to the ball raceways 92 and rotatably drives the locking balls in the direction of arrow 74, which then circulate on the ball raceways 92 perpendicular to the drawing plane of FIG. 3.

The balls 21 which rotate at high speed throw off any chips adhering to the locking balls 21. The cooling medium adhering to the locking balls is also thrown off. The locking balls are thereby kept dry and free from chips. The air current circulating in the entire ring-shaped groove of the locking balls produces a strong circulating air current, which also enters the bores of the retractable nipple above. In FIG. 3, the bores are labeled as sloped channel 53 and are in air communication with the adjacent horizontal channel 54.

In another air pathway, the pressure medium is guided from the air connection 44 into the upwardly sloped channel 50, where the air exits in the region of the blow-off openings 51. A flat recess 52 is also disposed in proximity of the blow-off openings 51.

The ball channel 107 through which an air current circulates, is connected via the opening 108 with the sloped channel 50, so that both channels are connected for air transfer and the turbulence is also transferred from the ball channel 107 to the sloped channel 50.

The air circulating in the ball channel 107 and in the slope to channel 50 provide superior drying efficiency for the fluid medium entering the housing of the clamping system.

FIG. 4, in comparison to FIG. 3, shows a downward open center opening 55 on the clamping system. The center interior space 30 in the tubular housing 1 thereby extends downwardly into the open center opening 55. The center opening 55 allows water or chips to drain or drip downwardly from the interior space 30. Moreover, blow-off air which can flow through the entire inner space 30 can be introduced from the bottom via the center opening 55 (not shown in detail).

Unlike the embodiment of FIG. 3, the retractable nipple 3 is also shown as being connected to a catch screw 56, which under certain installation conditions causes the retractable nipple insert to be caught by a catch device and to retract into the clamping system.

Also shown is the first embodiment of a built-in module 57 which will be described in more detail with reference to FIGS. 5 and 6.

This built-in module is characterized in that the ball support 5 forms a connected part with the spring support 6 and that the springs 7 are securely clamped between the two parts 5, 6. The aforedescribed parts 5, 6, 7 are hereby combined in form of a built-in module 57. The built-in module can be easily exchanged.

FIG. 5 shows the second embodiment of a built-in module 58, wherein the ball support 5 is connected with the spring support 6 by a corresponding thread 60, with a corresponding seal 61 arranged in the gap.

FIG. 6 shows another embodiment of the built-in module 59, wherein the ball support 5 is connected with the spring support 6 by a screw 64. The two parts are connected for easy disengagement. Vertical blow-off bores 66 are provided in the region of the spring support 6. The ball support 5 forms an upper, approximately cup-shaped opening 63, whereas the ball support 5 in the built-in module of FIG. 5 forms an approximately funnel-shaped conical opening 62, in which the likewise conical section of the retractable nipple 3 can be inserted in a self centering manner.

In the embodiment of FIG. 6, the screw 64 is screwed into the corresponding receptacle in the ball support 5 with a seal 65.

As mentioned in the specification, the built-in modules 57-59 can advantageously be easily exchanged because the position of the springs is fixed. The quick-action clamping system can therefore be mounted in a vertical as well as in an overhead position without the risk that the springs move from their installed position in the built-in module.

FIG. 7 shows a quick-action clamping system configured as a built-in module 70. This quick-action clamping system can advantageously be inserted into an opening in a machine table or clamping plate as a module and operates completely independently. The built-in module 70 is installed with screws 67 which secure the built-in module in the opening (not shown) of the machine table. By using the built-in modules 57-59, the employed piston 4 only needs be inserted in the cover 2, and the completely pre-assembled built-in module 57-59 with the locking balls 21 placed on top can be inserted in the cover from below. This completes the installation of the entire system.

Accordingly, installation is very simple. For sake of completeness, the retractable nipple is also shown as being connected to a workpiece palette 68, 68'. Clamping tools for holding the workpieces to be machined (not shown in detail) can be arranged on the workpiece palette 68, 68'; alternatively, the workpieces can be attached directly to the workpiece palette 68.

FIG. 8 depicts a clamping system of FIG. 7, where the workpiece palette 68, 68' has been removed. As can be seen, the locking balls 21 protrude into the center opening 32 of the housing with a large insertion depth, which also shows the excellent support on the retractable nipple 3.

Radially outer sloped bores 71 originate from the sloped channel 50 for keeping the gap of the screws 67 unobstructed.

The screw 64 arranged at the bottom in the housing can also be seen through the central opening 32.

The sloped bores 50 are in air communication with sloped bores 69, as shown in FIG. 7.

FIGS. 9 and 10 show further details of the embodiment of a quick-action clamping cylinder according to FIG. 3. For example, the retractable nipple 3 is connected with the workpiece palette 68, wherein the two different semi-cross-sections illustrate again the locked and unlocked positions.

FIG. 10 show the position of the opposing connections, namely the pressure connections 11 in relation to the air connection 44.

In all other aspects, the description of the parts in FIG. 10 is identical to the description of the parts in FIGS. 7 and 8.

FIG. 11 shows another embodiment of a quick-action clamping system in the form of a built-in module 80 which is inserted as a built-in cartridge in a machine table. Importantly, the entire built-in module 80 is inserted in this central receptacle 73 in the machine table 72, which does not require high-precision machining. The built-in module 80 is attached with screws 15.

In this embodiment, the lower spring support 6 is connected with a cylindrical tube 74 in one piece and made of the same material. In this way, the cylindrical tube 74 can easily be inserted in the imprecisely machined receptacle 73 in the machine table, wherein the two seals 77, 77a completely seal the cylindrical tube 74 in the receptacle 73. Importantly, the two seals 77, 77a are axially spaced apart and separate the pressure oil space from the air space. The pressure medium is introduced via the connection 11 and reaches the cylinder space 12 via a ring-shaped channel 75 and a connecting bore 76, so that the piston 4 can be moved into its unlocked position against the force of springs 7.

The upper seal 77a prevents the pressure medium from exiting at the top, and the lower seals 77 prevents the pressure medium from entering the air space below.

The air space 78 is in air communication with the air connection 44 and terminates via a plurality of transverse and sloped bores in the associated blow-off openings. For example, the air space 78 is in air communication with the interior space of the housing via the gap 79. A number of sloped and transverse bores extend from this interior space upwardly toward the ball contact surfaces, to the blow-off openings disposed on the cover, and to other parts.

The air is guided into the central interior space 30 of the housing through a central vertical bore 109 in a corresponding screw 110. The air space 78 terminates in the circumferential ring-shaped channel 81.

The air-conducting gap 79, through which the compressed air is supplied to the interior space of the housing, extends from the ring-shaped channel 81.

This built-in module 80 has the advantage that only the inside of the cylindrical tube 74 must be precisely machined for reliably guiding the piston 4. The entire built-in module 80 can therefore be supplied as a separate part and inserted into a relatively imprecisely machined receptacle 73 in the machine table 72. It operates reliably, because the parts machined with high precision are arranged in the interior space of the built-in module 80. The built-in module 80 can hence be easily and cost-effectively installed.

Moreover, another part was eliminated compared to the aforedescribed embodiments, because the cylinder tube 74 connected with the spring support 6 is made as one part and of the same material; at the same time, the part provides a seal between the pressure oil space and the air space.

FIG. 12 shows another embodiment of a clamping system which operates with an ejector piston 87. As will be understood by those skilled in the art, the arrangement with an ejector piston 87 having the illustrated pressure oil and air pathways can be applied to any one of the aforedescribed embodiments. The described embodiment is also not limited to the illustrated clamping system.

Importantly, the ejector piston 87 is arranged below the central interior space and below the locking system and can be displaced in the vertical direction (directions of the arrow 88).

For this purpose, a pressure medium is supplied via a pressure connection 111, which is supplied to the bottom-side pressure space 85 via the gravity-fed bore 84 and a radially inward connecting groove 86. The ejector piston 87 is thereby lifted in the direction of the arrow 88.

The pressure medium is supplied to the corresponding pressure space 83 via the pressure connection 82 and moved to the ring-shaped projection 112 of the ejector piston 87, driving the ejector piston 87 downward in the direction of arrow 88. The ejector piston is installed to prevent dirt from entering the center interior hole 30 of the clamping system when the retractable nipple 3 is removed. When the retractable nipple 3 according to FIG. 12 is pulled out of the center inner hole 32, the ejector piston 87 moves upward in the direction of arrow 88 and seals the center inner hole 32 towards the top.

If several clamping systems with associated clamping cylinders are arranged on the machine table and if several of the clamping systems are not in use, then the ejector piston 87 moves into its upper sealing position and seals the respective center holes 32 in the housing of the clamping system.

At the same time, the ejector piston 87 can advantageously be used for inserting retractable nipples that are connected with very heavy workpiece palettes. When the ejector piston 87 is moved out of the center hole 32, the workpiece palette with the retractable nipple disposed below is placed on the upper end face of the ejector piston 87. The ejector piston 87 is then moved downwardly in the direction of arrow 88 by supplying pressure oil, so that the retractable nipple moves gently and controllably into the center inner hole 32, thus preventing damage to the clamping system or locking system.

The ejector piston 87 has the additional advantage that chips or other contamination deposited in the interior space on the front face of the ejector piston 87 can be easily removed when the ejector piston 87 is extended.

Any type of pressure medium can be used and supplied through the connections 82, 111.

The ejector piston 87 can also be displaced by a spring force, without using a pressure medium.

FIGS. 13 and 14 show two related embodiments of clamping systems having a simple construction. This results in low installation heights, because spring assemblies can be eliminated, and locking and unlocking can be accomplished by using a pressure medium.

For this purpose, two separate pressure connections 93, 94 are arranged on the built-in module 90. The pressure connection 93 is provided as a release connection, and the pressure connection 94 as a force-amplifying connection for amplifying the closure force of the locking ball 21.

The springs 95 which are uniformly distributed along the periphery generate the locking force operating on the piston 4, which is amplified by introducing the pressure medium via the pressure connection 94 into the pressure space 96.

Unlocking is accomplished by supplying a pressure medium into the pressure connection 93, whereby the pressure medium is supplied to the upper pressure space 97, moving the locking piston 4 downwardly.

The simple construction and the low installation height are illustrative of the advantages of the present invention. Because the locking balls 21 are in the self-locking position due to the three-point support, only relatively small lever forces on the piston 4 are required to attain and maintain the locked position. Accordingly, rather weak springs 85 can be employed.

According to another advantageous feature of this embodiment, the lower ball support 91 simultaneously forms the bottom part 89 and this part is connected as one-piece and made of the same material as the afore-mentioned cylindrical tube 74. This results in a small number of parts, namely only this part 89 in combination with the piston 4, the cover 2, and the associated locking balls 21.

The ball support 91 forms the aforedescribed ball raceways 92. The embodiment of a surface-mounted module 100, as compared to the built-in module 90 according to FIG. 14, is distinguished by a different routing of the pressure medium. A vertical gravity-fed bore 98 extends downwardly from the pressure connection 94, and terminates via a radial connecting channel 99 in the pressure space 97.

On the other hand, a horizontal bore 91 extends from the pressure connection 93 into the pressure space 96.

This embodiment also has a small number of parts and a low installation height, while operating more reliably.

Advantageously, the present invention uses turned parts that are easily machined and inexpensive, and does not require complex machining of expensive tools steels, which would significantly increase the manufacturing costs. A compact quick-action clamping system with a small diameter and high locking forces is described, which operates reliably and provides an absolute positive connection in the locked position. It is therefore impossible to pull the retractable nipple out by way of a backlash (of for example 2 mm) when the system is locked, which must be accepted with conventional systems.

| Figure Legend | | | |
|---|---|---|---|
| 1 | tubular housing | 31 | direction of arrow |
| 2 | cover | 32 | hole |
| 3 | retractable nipple 3' | 33 | release position |
| 4 | piston | 34 | ball mount (bottom) |
| 5 | ball support | 35 | spring support surface (top) |
| 6 | spring support | 36 | spring support surface (bottom) |
| 7 | spring | 37 | chamfer |
| 8 | locking ball | 38 | groove |
| 9 | recess | 39 | radius (top) |
| 10 | threaded section | 40 | radius (bottom) |
| 11 | pressure connection | 41 | connecting bore |
| 12 | cylinder space | 42 | cover |
| 13 | blind hole | 43 | gap |
| 14 | ring-shaped recess | 44 | air connection |
| 15 | screw | 45 | ascending bore |
| 16 | clamping ring | 46 | sloped bore |
| 17 | safety ring | 47 | direction of arrow |
| 18 | safety ring | 48 | bore |
| 19 | screw | 49 | ascending bore |
| 20 | ring-shaped recess | 50 | sloped channel |
| 21 | locking ball | 51 | blow-off opening |
| 22 | position | 52 | flat recess |
| 23 | position | 53 | sloped channel |
| 24 | position | 54 | horizontal channel |
| 25 | chamfer (small) | 55 | center opening |
| 26 | chamfer (large) | 56 | catch screw |
| 27 | ball mount (top) | 57 | built-in module |
| 28 | chamfer | 58 | built-in module |
| 29 | lever | 59 | built-in module |
| 30 | interior space | 60 | thread |
| 61 | seal | 87 | ejector piston |
| 62 | conical opening | 88 | direction of arrow |
| 63 | opening | 89 | bottom section |
| 64 | screw | 90 | built-in module |
| 65 | seal | 91 | lower ball support |
| 66 | blow-off bore | 92 | ball raceways |
| 67 | screw | 93 | release-pressure connection |
| 68 | workpiece pallets 68' | 94 | pressure connection |
| 69 | sloped bore | 95 | spring |
| 70 | built-in module | 96 | pressure space (bottom) |
| 71 | sloped bore | 97 | pressure space (top) |
| 72 | machine table | 98 | gravity-fed bore |
| 73 | receptacle | 99 | connecting channel |
| 74 | cylindrical tube | 100 | surface-mounted module |
| 75 | ring-shaped channel | 101 | bore |
| 76 | connecting bore | 102 | lever arm |
| 77 | seal 77a | 103 | lever arm |
| 78 | air space | 104 | ring-shaped shoulder (piston 4) |
| 79 | gap | 105 | cover projection (cover 2) |
| 80 | built-in module | 106 | ring-shaped shoulder |
| 81 | ring-shaped channel | 107 | ball channel |
| 82 | pressure connection (ejector) | 108 | opening |
| | | 109 | bore |
| 83 | pressure space | 110 | screw |
| 84 | gravity-fed bore | 111 | pressure connection |
| 85 | pressure space | 112 | ring-shaped projection |
| 86 | connecting groove | | |

The invention claimed is:

1. A quick-action clamping cylinder comprising a housing and a cover covering the housing, the cover having a center opening for receiving a retractable nipple arranged on the lower side of a workpiece pallet, and a plurality of locking elements providing a spring-loaded lock for the retractable nipple in the housing, wherein the locking elements are in locked position in spring-loaded contact with the outer periphery of the retractable nipple and move into unlocked position by disengaging from the retractable nipple through movement of a piston operated by pressure means, wherein the piston has at least one first chamfer with a slope in the radial inward direction, wherein the locking elements contact the first chamfer in the locked position in a first element position for transmitting a load, wherein the locking elements further contact the bottom side of the cover in a second element position, and wherein the locking elements further contact a second chamfer having a slope opposite to the slope of the first chamfer on the outer periphery of the retractable nipple in a third element position.

2. The quick-action clamping cylinder according to claim 1, wherein the piston is displaceably and sealingly guided between the surfaces of the cover and of the housing.

3. The quick-action clamping cylinder according to claim 1, wherein the part of the piston contacted by the locking elements is formed as a bendable ring-shaped projection.

4. The quick-action clamping cylinder according to claim 1, wherein the outside of the piston includes sealing rings which sealingly contact an unsupported cover projection of the cover.

5. The quick-action clamping cylinder according to claim 1, wherein each spring contacts with a radial outward section a radially outwardly oriented, upper spring support surface on the bottom side of the piston and a radially outwardly oriented lower spring support surface of the spring support.

6. The quick-action clamping cylinder according to claim 5, wherein the outwardly oriented, upper spring support is approximately aligned below a cylinder space, so that the cylinder space is not deformed when the locking engagement is released.

7. The quick-action clamping cylinder according to claim 5, wherein the lower spring support and hence the entire locking device is fitted and held in the tubular housing of the clamping cylinder by locking elements, which are uniformly distributed along the periphery.

8. The quick-action clamping cylinder according to claim 1, wherein a cylinder space having a small volume is provided by an opposing arrangement of a cover projection in the cover and an offset in the piston.

9. The quick-action clamping cylinder according to claim 1, wherein the cylinder space is arranged radially outwardly in the tubular housing, so that the screws absorb deformation forces to which the cover may be subjected.

10. The quick-action clamping cylinder according to claim 9, wherein the transition region in the cover between the downwardly extended cover projection for guiding the piston and the region of the cover through which the screws extend, is formed so as to be capable of transmitting a large load and protected against deformations.

11. The quick-action clamping cylinder according to claim 9, wherein the cover has a diminishing material thickness in the region that extends radially inwardly as viewed from the extended cover projection.

12. The quick-action clamping cylinder according to claim 1, wherein on the piston, the first chamfer is followed in the axial direction by a third chamfer having a slope that is greater than the slope of the first chamfer.

13. The quick-action clamping cylinder according to claim 1, wherein a conical tip of the retractable nipple engages with the center interior space in the clamping cylinder, where it centers in an opposing conical recess.

14. The quick-action clamping cylinder according to claim 1, wherein the blow-off air is supplied to a tubular housing via an air connection, from where it reaches via an ascending vertical bore the lower region of the tubular housing, where the air enters a circumferential recess.

15. The quick-action clamping cylinder according to claim 14, wherein the blow-off air flows between the bottom side of a spring support and the inside of the cover through a gap extending approximately over the entire diameter of the bottom side of the housing, and branches to the outside region of the clamping cylinder by way of a first air pathway through the recess arranged along the outer periphery, and to the center interior region of the clamping cylinder by way of a second air pathway.

16. The quick-action clamping cylinder according to claim 14, wherein the blow-off air produces an air flow directed at an angle against the bottom side of the locking elements, with the air flow rotatably driving the locking elements, causing them to circulate in the peripheral direction about the retractable nipple.

17. The quick-action clamping cylinder according to claim 1, wherein the retractable nipple is connected with a catch screw, which cooperates with a catch device disposed on a reciprocating piston of the clamping cylinder, wherein the catch device catches the retractable nipple exiting the opening in the clamping cylinder and retracts the retractable nipple into the clamping cylinder.

18. The quick-action clamping cylinder according to claim 1, wherein a locking element support and a spring support are connected with each other, forming a built-in module which clamps the springs.

19. The quick-action clamping cylinder according to claim 1, wherein the quick-action clamping cylinder is mounted in a machine table as a built-in module configured as a built-in cartridge.

20. The quick-action clamping cylinder according to claim 19, wherein the lower spring support is connected with a cylindrical tube made of the same material (as a single piece) to form the cylinder for guiding the piston.

21. The quick-action clamping cylinder according to claim 1, wherein the first chamfer has a slope smaller than a self-locking threshold.

22. The quick-action clamping cylinder according to claim 9, wherein the cylinder space arrangement is proximate of the radially outwardly arranged screws between the cover and the tubular housing, so that the screws absorb deformation forces to which the cover may be subjected.

23. The quick-action clamping cylinder according to claim 15, wherein the blow-off air produces an air flow directed at an angle against the bottom side of the locking elements, with the air flow rotatably driving the locking elements, causing them to circulate in the peripheral direction about the retractable nipple.

24. The quick-action clamping cylinder according to claim 1, wherein the tubular ring shape projection of the piston defines a third chamfer along which the locking elements contact when in the unlocked position, the third chamfer having a slope greater than that of the first chamfer.

25. The quick-action clamping cylinder according to claim 1, wherein the locking elements are elastically deformable.

26. The quick-action clamping cylinder according to claim 1, wherein the locking elements are locking balls.

27. The quick-action clamping cylinder according to claim 21, wherein the slope of the first chamfer is smaller than 7 degrees.

\* \* \* \* \*